US006614002B2

(12) United States Patent
Weber

(10) Patent No.: US 6,614,002 B2
(45) Date of Patent: Sep. 2, 2003

(54) LASER MACHINING HEAD

(75) Inventor: Ludwig Weber, Gaggenau (DE)

(73) Assignee: Precitec KG, Gaggenau-Bad Rotenfels (DE)

( * ) Notice: Subject to any disclaimer, the term of this patent is extended or adjusted under 35 U.S.C. 154(b) by 0 days.

(21) Appl. No.: 10/000,401

(22) Filed: Dec. 4, 2001

(65) Prior Publication Data

US 2002/0088783 A1 Jul. 11, 2002

(30) Foreign Application Priority Data

Dec. 4, 2000 (DE) .......................... 100 60 176

(51) Int. Cl.$^7$ .......................... B23K 26/02; B23K 26/08
(52) U.S. Cl. .............................. 219/121.78; 219/121.83
(58) Field of Search ................ 219/121.78, 121.81, 219/121.82, 121.83, 121.86

(56) References Cited

U.S. PATENT DOCUMENTS

| | | | | |
|---|---|---|---|---|
| 5,489,758 A | * | 2/1996 | Nihei et al. ............. | 219/121.63 |
| 5,508,490 A | * | 4/1996 | Klose .................... | 219/121.62 |
| 5,676,866 A | | 10/1997 | in den Baumen et al. | |
| 5,938,953 A | * | 8/1999 | Jurca .................... | 219/121.83 |

FOREIGN PATENT DOCUMENTS

| | | | |
|---|---|---|---|
| DE | 41 26 351 A1 | 2/1993 | |
| DE | 299 03 385 U1 | 6/1999 | |
| JP | 00225481 A | 8/2000 | |

OTHER PUBLICATIONS

"Schweissuberwachung Laser Welding Monitor LWM," Precitec Company Catalogue, 2000, p. 41.

* cited by examiner

*Primary Examiner*—M. Alexandra Elve
(74) *Attorney, Agent, or Firm*—Birch, Stewart, Kolasch & Birch, LLP

(57) ABSTRACT

A laser machining head for machining a workpiece by a laser beam having a housing which has an inlet opening and an outlet opening between which a passage is constructed for the laser beam through which is led a working beam pathway; focusing optics for focusing the laser beam into a working focus which is located outside the housing at a distance from the outlet opening; a sensor arrangement, and a beam deflecting device. In order to provide a laser beam machining head which, whilst having fixed and compact external dimensions, enables a simple adaptation of the sensors to the respective machining tasks, the sensor arrangement comprises a sensor module arranged in a side wall of the housing next to the laser beam through passage; and the radiation diverting device directs the radiation, coming from a zone of interaction determined by the working focus, onto sensors of the sensor arrangement so that at least one portion of the radiation can be detected for monitoring the machining of a workpiece.

17 Claims, 3 Drawing Sheets

LASER MACHINING HEAD

This nonprovisional application claims priority under 35 U.S.C. § 119(a) on Patent Application No. 100 60 176.6 filed in Germany on Dec. 4, 2000, which is herein incorporated by reference.

FIELD OF THE INVENTION

The invention relates to a laser machining head for the machining of a workpiece by means of a laser beam, in particular for the welding or cutting of workpieces by laser beams.

DESCRIPTION OF THE RELATED ART

In order to be able to monitor the machining operation, that is in particular the welding or cutting process, depending on the task in hand different sensors for measuring the radiation coming from a zone of work or interaction determined by the working focus are necessary. These sensors are usually flange-mounted laterally onto the laser machining head. In this case UV sensors for monitoring any plasma forming over the zone of interaction, a temperature sensor or infrared sensor for detecting the radiation coming from the region around what is known as the keyhole determined by the working focus by which peripheral fusion and the temperature profile during machining can be monitored and a back-reflection sensor which detects the back radiation of the laser from the keyhole are standardly provided.

In many tasks, however, it is only by means of statistical studies in prototype production that it is possible to find the right combination of sensors which allow as significant an analysis of the process parameters as possible. This results in a change in the external geometry of the head which plays an important role in numerous operational tasks. Since, for example, when burrowing into components collisions must be avoided, a change in the geometry of the head is often not possible.

From the *catalogue of the company precitec*, 2000 issue, page 41, a laser welding monitor is already known which is flange-mounted laterally onto a laser machining head. Depending on which sensors are necessary for monitoring the process in laser welding, the known laser welding monitor must be correspondingly modified.

JP 2000 225 481 discloses a laser machining head on which various sensors for detecting the radiation coming from the zone of interaction are arranged one behind the other. In this case the radiation coming from the zone of interaction first of all passes through the focusing optics for the machining beam and then encounters beam splitters or deflecting mirrors which direct the radiation onto the corresponding sensors. Depending on which and how many sensors are necessary for the process monitoring appropriate sensor housings must be fitted on the side of the laser machining head facing away from the working focus.

BRIEF SUMMARY OF THE INVENTION

Proceeding from this the aim underlying the invention is to develop further a laser machining head of the type specified at the outset in such a way that with fixed and compact external dimensions, it allows simple adaptation of the sensors to the machining tasks in question. This aim is achieved by means of a laser machining head.

Thus, in a laser machining head for the machining of a workpiece by means of a laser beam having a housing which has an inlet opening and an outlet opening between which a passage for the laser beam is constructed through which a pathway for the working beam is led; focusing optics for focusing the laser beam into a working focus which is located outside the housing at a distance from the outlet opening; and a sensor arrangement, it is provided according to the invention that the sensor arrangement comprises a sensor module arranged in a side wall of the housing beside the laser beam passage and that a beam deflecting device directs radiation coming from a zone of interaction determined by the working focus onto sensors in the sensor arrangement so that at least a portion of the radiation can be detected for monitoring the machining of a workpiece.

Due to the use according to the invention of a sensor module arranged in a side wall of the laser machining head, it is a simple matter to achieve that the sensors needed for the machining task in question and the laser wavelength employed can be integrated into the laser machining head without the necessity of altering the external dimensions of the laser machining head.

In an advantageous development of the invention, it is provided that the beam deflection device comprises imaging optics which are arranged behind the focusing optics with respect to the radiation coming from the zone of interaction in order to image the zone of interaction onto the sensor module.

A further refinement of the invention is characterised in that the beam deflection device possesses a first beam splitter, which separates a portion of the radiation coming from the zone of interaction out of the optical path of the working beam, and a second beam splitter which directs a portion of the incident radiation to the sensor module while it allows a further portion through, the second beam splitter being arranged in a side wall of the housing ahead of a connecting aperture to which an observation device can be connected. By this means, it is made possible in the case of certain end uses which require sectional or close-up tracking during machining to attach an appropriate observation device, e.g. a video camera or the like, to the laser machining head without this having an adverse effect on the sensor arrangement.

The second beam splitter is suitably arranged in a side wall of the housing opposite the sensor module, the beam deflection device having first and second deflection mirrors in order to redirect the portion of the radiation coming from the zone of interaction separated out by the beam splitters transversely across the passage to the side of the sensor module or parallel to the side wall accommodating the sensor module.

In a preferred development of the laser machining head according to the invention, it is provided that the sensor module is constructed as a side wall module. By this means, the sensor arrangement can not only be changed in simple manner according to the requirements at the time of the planned machining task and the laser sources employed but also the servicing of the sensor arrangement is likewise simplified since the side wall module need merely be exchanged for another one having the same sensors. This means downtime for the laser machining system due to servicing of the sensor arrangement can be reduced to a minimum.

It is possible in principle to equip the sensor module with only one sensor when, for example, only the temperature of the zone of interaction or the laser light reflected back from the working focus need be measured integrally. The advantages of the arrangement according to the invention can, however, be especially well exploited when in particular the sensor module has two or more sensors to which the incident radiation can be delivered via a third beam splitter.

If two sensors are provided it is particularly advantageous for the third beam splitter, on which the zone of interaction is imaged by the imaging optics, to be constructed as a reflecting position filter aperture so that the sensors detect different regions of the zone of interaction.

It is advantageous if individual sensors in the sensor arrangement comprise a filtering device so that they detect a selected spectral range of the radiation coming from the zone of interaction.

In a particularly advantageous development of the invention, it is provided that in the sensor module a reference sensor is provided which detects a portion of the working laser radiation separated out by the first beam splitter.

Another useful development of the invention distinguishes itself in that the sensor arrangement encompasses at least one but preferably two or more sensors arranged in the region of the inlet opening in one or different side walls of the housing which is or are constructed for the detection of radiation, in particular plasma radiation, coming from the zone of interaction.

In order to permit a high quality and interference-free laser operation, it is provided that the sensor arrangement for monitoring a protective glass, which is arranged in the working beam path between the outlet opening and the focusing optics, comprises at least one further sensor which is arranged in a lateral section of the housing in the area of the protective glass in order to pick up scattered light coming from the protective glass. This allows for the early detection of fatigue, soiling and damage so that the protective glass can be changed in good time before it is destroyed during the work process.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
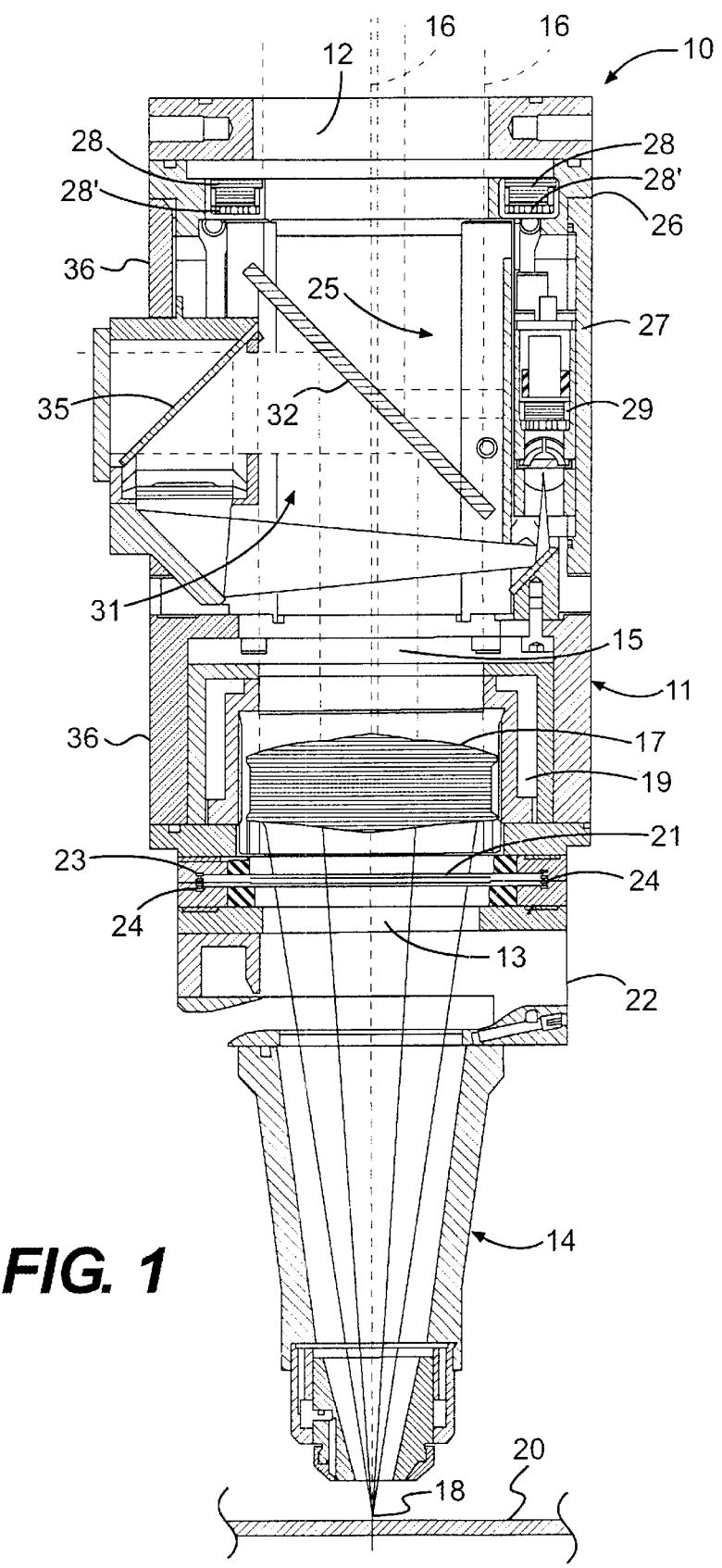
FIG. 1 a simplified schematic sectional view of a laser machining head.

In the different figures of the drawing the components which correspond to each other are provided with the same reference numerals.

As shown in FIG. 1, the laser machining head 10 according to the invention has a housing 11 with an inlet opening 12 and an outlet opening 13 as well as a laser jet 14. Between the inlet opening 12 and the outlet opening 13 in the housing 11, a passage 15 is provided for a laser beam 16 through which is passed the working beam 16' which in FIG. 1 is indicated by the optical axis of a focusing optics 17 for the working laser beam 16.

The focusing optics 17, which focuses the working laser beam 16 into a working focus 18, is arranged in a water cooled lens holder 19 which is constructed as an exchangeable lens socket so that focusing optics with different focal lengths can be fitted in the laser machining head 10.

In order to protect the focusing optics 17 from influences originating in a zone of interaction between working focus and work piece 20, a protective glass 21 is arranged between the focusing optics 17 and the outlet opening 13 of the housing 11. Between the housing 11 and the laser jet 14, a transverse beam device 22 is arranged by means of which is generated a supersonic gas stream acting transversely to the laser beam 16, in order to reduce soiling of the protective glass 21. The gas stream acting transversely to the laser beam 16 thus causes particles, which originate from the zone of interaction determined by the working focus 18 onto the workpiece being machined, to be blown away laterally from the outlet opening 13 of the housing 11 and thus removed. Any remaining particles, which still get into the outlet opening 13, are then kept away from the focusing optics 17 by the protective glass 21.

The protective glass 21 is arranged in a protective glass cassette 23 so that the soiled protective glass 21 can be changed quickly and without any additional tools.

For monitoring the protective glass 21, one or more sensors are arranged laterally next to the protective glass in order to catch the scattered light coming from the protective glass 21. The sensors 24 are in this case advantageously tuned to the wavelength of the working laser beam 16 being used. In particular the sensors 24, which can be evenly distributed over the circumference of the protective glass, are so aligned that they essentially pick up only the scattered light component running perpendicular to the working beam direction.

The sensors 24 for monitoring the protective glass form part of a sensor arrangement 25 which serves for monitoring the quality and process. The sensor arrangement 25 has a sensor module 27, arranged in a side wall 26 of the housing 11, which preferably is constructed as a side wall module so that the sensor module 27 can be simply exchanged as a component part of the side wall 26 of the housing 11 of the laser machining head 10.

Apart from the sensor module 27, the sensor arrangement 25 also has one or more sensors 28 which serve to observe a plasma forming above the zone of interaction determined by the working focus. If several sensors 28 are provided for picking up the plasma radiation, these are preferably arranged at the same intervals around the laser beam through passage 15 close to the inlet opening 12.

Figure 2:
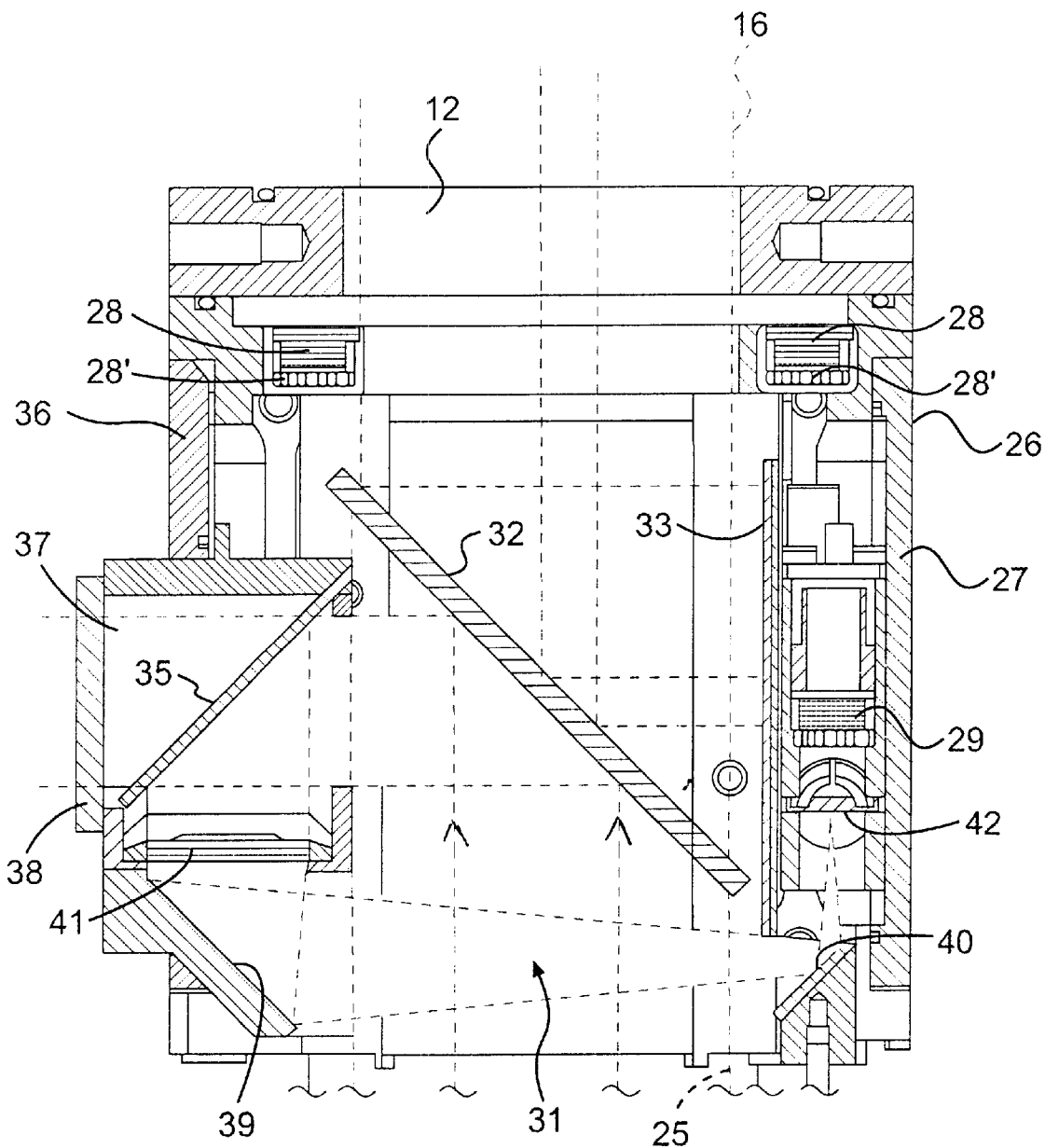
FIG. 2 a simplified schematic sectional view of the sensor containing part of the laser machining head according to the invention.

In order to direct onto the sensors 29, 30 radiation coming from the zone of interaction, a beam diverting device 31 is provided which is now described in more detail with the aid of FIG. 2.

The beam diverting device 31 has a first beam splitter 32 which consists of quartz glass and which carries on its surfaces a glare suppressant tuned to the wavelength of the working beam 16. Depending on the laser wavelength used, it is possible also to use other suitable transparent materials. Of the incident working laser beam 16 therefore only a very small percentage is diverted in the direction of the sensor module 27 and strikes a screening element 33, which screens the sensor module 27 from the laser beam passage 15 up to a region of the through passage not shown in any further detail, which is allocated to a reference sensor 34 (see FIG. 3) provided in the sensor module 27.

A beam coming from the zone of interaction, after passing through the focusing optics 17, is diverted through the first beam splitter 32 to a second beam splitter 35 which is arranged in a side wall 36 of the housing 11 in front of a connecting opening 37 to which can be connected an observation device (not shown). In the embodiment example shown, the connecting opening 37 is closed by a cover plate 38. A proportion of the radiation which strikes the second beam splitter 35 is diverted in the direction of a first deviation mirror 39 which directs the incident radiation transversely across the passage 15 to the side of the sensor module 27. Here there is provided a second deviation mirror 40 which directs the radiation in a direction running parallel to the side wall 26.

The radiation diverting device 31 has an imaging optics 41 which is arranged between the second beam splitter 35 and the first deviation mirror 39 and which together with the focusing optics 17 produces an image of the zone of interaction or the working focus 18 on an input element 42 of the sensor module 27.

Figure 3:
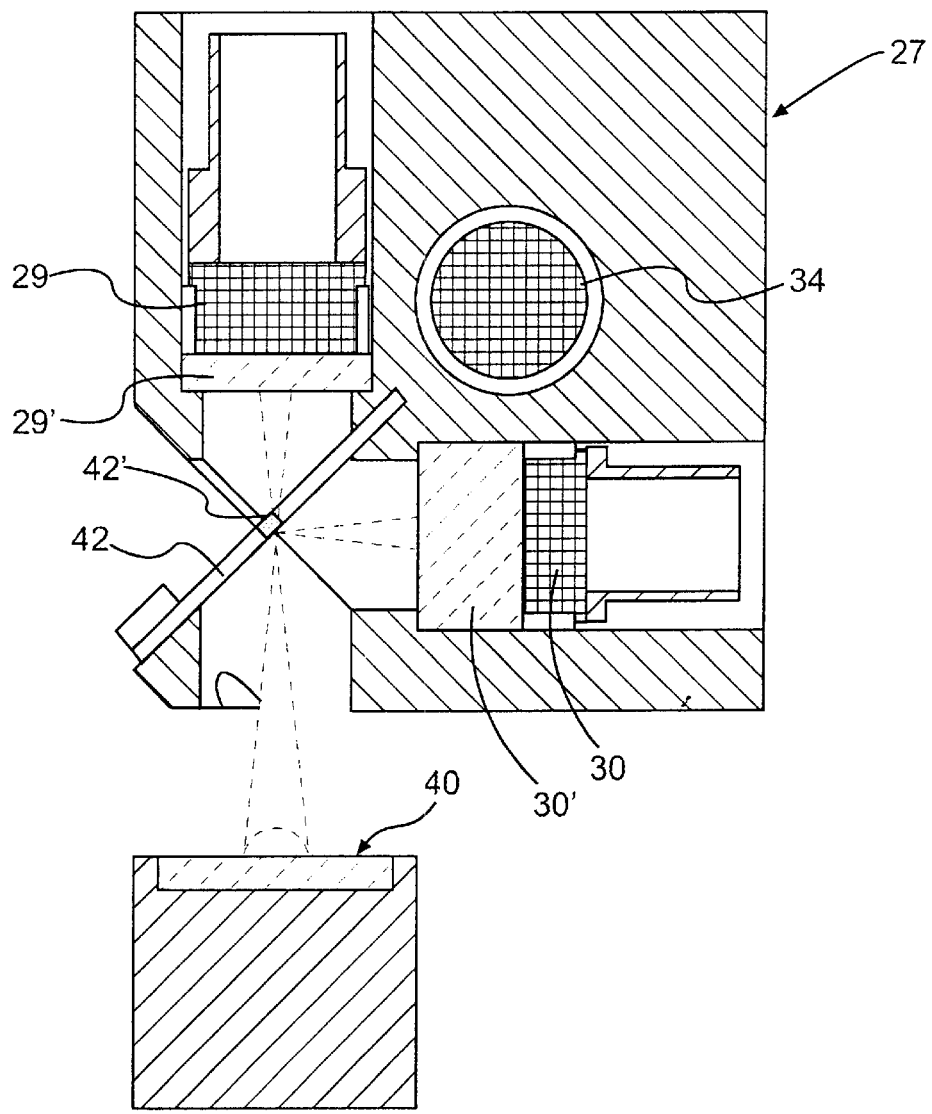
FIG. 3 a simplified schematic sectional view of a sensor module for a laser machining head according to the invention.

As shown purely schematically in FIG. 3, the input element is formed by a third beam splitter 42 which is constructed as a reflecting position filter aperture in order to divert onto the sensor 30 the central region of the zone of interaction, i.e. the working focus 18, whilst the edge region of the zone of interaction is allowed through to the sensor 29. In order to adapt the individual sensors 28, 29, 30 of the sensor arrangement 25 to the particular wavelength of the radiation to be detected, suitable filter devices 28', 29',30' are provided.

During a laser machining process, i.e. during the laser cutting or welding, typically the UV radiation coming from the plasma is monitored with the sensors 28. In this case, the sensors 28 are arranged next to the passage 15 in such a way that they look into the direction of radiation at an angle of observation of 120°. The output signals of the plasma sensors 28 can then be used for evaluating the visible portion of the welding process. Preferably three plasma sensors 28 are provided which are evenly distributed over the circumference of the passage.

In the sensor module 27 the temperature sensor 29 observes the edge region of the zone of interaction, as the central region, i.e. the working focus 18, is diverted from the reflecting central aperture 42' of the beam splitter 42, constructed as position filter, to the back reflex sensor 30. The back reflex sensor 30 therefore includes the area of the so-called keyhole.

The three different sensor signals from the plasma sensors 28, the temperature sensor 29, which monitors the edge fusion and the temperature profile, and the back reflex sensor 30, which detects the back radiation of the laser from the keyhole, together with the sensor signal are evaluated by the reference sensor 34, in that the measured signals are compared with the stored values of a representative weld seam or a representative cut.

Depending on the processing task in hand, in may be necessary to vary the area to be imaged, so that different apertures, especially different position filter apertures may have to be provided as input elements of the sensor module. For example, it is possible that in the sensor module 27 it may be necessary to arrange a plasma sensor together with a back reflex sensor or a temperature sensor. The third beam splitter 42 is then to be constructed accordingly, depending on whether the temperature or back reflex sensor is to operate with a position filter aperture or in integrated manner without position filter aperture.

The laser machining head according to the invention has a compact structure, as the sensors necessary for monitoring the process are integrated in the housing 11 of the laser machining head 10. Because of this integrated sensor arrangement it is possible to easily adapt the laser machining head 10 according to the invention to different laser types and flexibly to different handling systems or laser processing machines. The connecting aperture to which an observation device can be connected, enables the employment of seam or cut tracing systems which improve the adjustment and control. In particular during laser welding it is possible to optimise the welding wire supply feed by observing this also when the laser welding system is in operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A laser machining head for machining a workpiece by means of a laser beam comprising:
    a housing having an inlet opening and an outlet opening between which a passage for the laser beam is constructed through which a pathway for the working beam is led;
    focusing optics for focusing the laser beam into a working focus which is located outside the housing at a distance from the outlet opening;
    a sensor arrangement having a sensor module arranged in a side wall of the housing beside the laser beam passage; and
    a beam deflecting device which directs radiation coming from a zone of interaction determined by the working focus onto sensors of the sensor arrangement so that at least a portion of the radiation can be detected for monitoring the machining of a workpiece.

2. The laser machining head according to claim 1, wherein the beam deflection device comprises an imaging optics which is arranged behind the focusing optics with respect to the radiation coming from the zone of interaction in order to image the zone of interaction onto the sensor module.

3. The laser machining head according to claim 1, wherein the beam deflection device possesses a first beam splitter, which separates a portion of the radiation coming from the zone of interaction out of the working beam path, and a second beam splitter which directs a portion of the incident radiation to the sensor module while it allows a further portion through.

4. The laser machining head according to claim 2, wherein the beam deflection device possesses a first beam splitter, which separates a portion of the radiation coming from the zone of interaction out of the working beam path, and a second beam splitter which directs a portion of the incident radiation to the sensor module while it allows a further portion through.

5. The laser machining head according to claim 3, wherein the second beam splitter is arranged in another side wall of the housing ahead of a connecting aperture to which an observation device can be connected.

6. The laser machining head according to claim 4, wherein the second beam splitter is arranged in another side wall of the housing ahead of a connecting aperture to which an observation device can be connected.

7. The laser machining head according to claim 3, wherein the second beam splitter is arranged in another side wall of the housing which is arranged opposite the sensor module, and that the beam deflection device has first and second deflection mirrors in order to redirect the portion of the radiation coming from the zone of interaction separated out by the beam splitters transversely across the passage to the side of the sensor module or parallel to the side wall accommodating the sensor module.

8. The laser machining head according to claim 5, wherein the second beam splitter is arranged in the another side wall of the housing which is arranged opposite the sensor module, and that the beam deflection device has first and second deflection mirrors in order to redirect the portion of the radiation coming from the zone of interaction separated out by the beam splitters transversely across the passage to the side of the sensor module or parallel to the side wall accommodating the sensor module.

9. The laser machining head according to claim 1, wherein the sensor module is constructed as a side wall module.

10. The laser machining head according to claim 1, wherein the sensor module has at least two sensors to which the incident radiation can be supplied via a third beam splitter.

11. The laser machining head according to claim 10, wherein the third beam splitter, on which the zone of interaction is imaged by the imaging optics, is constructed as a reflecting position filter aperture so that the sensors measure different regions of the zone of interaction.

12. The laser machining head according to claim 10, wherein individual sensors of the sensor arrangement comprise a filter device, so that they detect a selected spectral region of radiation coming from the zone of interaction.

13. The laser machining head according to claim 1, wherein individual sensors of the sensor arrangement comprise a filter device, so that they detect a selected spectral region of radiation coming from the zone of interaction.

14. The laser machining head according to claim 1, wherein the sensor module is provided with a reference sensor which detects a portion of the working laser beam which is separated out by the first beam splitter.

15. The laser machining head according to claim 1, wherein the sensor arrangement encompasses at least one sensor arranged in the region of the inlet opening in one or different side walls of the housing constructed for the detection of radiation coming from the zone of interaction.

16. The laser machining head according to claim 15, wherein the at least one sensor includes a plurality of sensors and wherein the radiation detected is plasma radiation.

17. The laser machining head according to claim 1, wherein the sensor arrangement further comprises at least one further sensor for monitoring a protective glass, which is arranged in the working beam path between the outlet opening and the focusing optics, the at least one further sensor is arranged in a lateral section of the housing in the area of the protective glass in order to pick up scattered light coming from the protective glass.

* * * * *